United States Patent
Blanchard

(10) Patent No.: US 9,456,546 B2
(45) Date of Patent: Oct. 4, 2016

(54) TRANSMISSION DEVICE FOR SELF-PROPELLED EQUIPMENT AND SELF-PROPELLED EQUIPMENT FITTED WITH SUCH A TRANSMISSION

(75) Inventor: Robert Blanchard, Le Boupere (FR)

(73) Assignee: France Reducteurs, Les Herbiers (FR)

( * ) Notice: Subject to any disclaimer, the term of this patent is extended or adjusted under 35 U.S.C. 154(b) by 656 days.

(21) Appl. No.: 13/292,450

(22) Filed: Nov. 9, 2011

(65) Prior Publication Data
US 2012/0129637 A1 May 24, 2012

(30) Foreign Application Priority Data
Nov. 22, 2010 (FR) ...................................... 10 59567

(51) Int. Cl.
| | | |
|---|---|---|
| F16H 7/14 | (2006.01) | |
| A01D 34/69 | (2006.01) | |
| A01D 69/06 | (2006.01) | |
| F16D 7/04 | (2006.01) | |
| F16D 43/202 | (2006.01) | |
| F16H 7/08 | (2006.01) | |
| F16H 48/16 | (2006.01) | |

(52) U.S. Cl.
CPC .............. *A01D 34/69* (2013.01); *A01D 69/06* (2013.01); *F16D 7/044* (2013.01); *F16D 43/2024* (2013.01); *F16H 7/0827* (2013.01); *F16H 48/16* (2013.01)

(58) Field of Classification Search
CPC ...... A01D 34/69; A01D 69/06; F16D 7/044; F16D 7/042; F16D 43/2024; F16H 7/0827
USPC ................................................. 474/116, 113
See application file for complete search history.

(56) References Cited

U.S. PATENT DOCUMENTS

| | | | | |
|---|---|---|---|---|
| 813,869 A | * | 2/1906 | Deiller ......................... | 192/69.1 |
| 2,573,140 A | * | 10/1951 | Heth ............................... | 464/39 |
| 2,931,476 A | * | 4/1960 | Zeidler et al. ............. | 192/89.21 |
| 3,269,200 A | * | 8/1966 | Vanghn et al. ................ | 474/35 |
| 3,625,325 A | * | 12/1971 | Hersey .......................... | 192/58.1 |
| 4,117,652 A | * | 10/1978 | Jones et al. .................... | 56/11.8 |
| 4,205,509 A | * | 6/1980 | Miyazawa et al. ............ | 56/11.3 |

(Continued)

FOREIGN PATENT DOCUMENTS

FR 1078160 A 11/1954

OTHER PUBLICATIONS

French Search Report, dated Jul. 7, 2011, corresponding from French application.

Primary Examiner — Michael Riegelman
(74) Attorney, Agent, or Firm — Sofer & Haroun, LLP

(57) ABSTRACT

Transmission device for self-propelled equipment, includes a housing having a driving input shaft transmitting movement to an output shaft, the input shaft bearing a receiving pulley around which pulley a belt transmission is wrapped. The input shaft also bears a component that rotates as one with the shaft and a member for controlling the movement of the pulley along the input shaft in terms of the pulley movement towards or away from the component so that the pulley, which is mounted with freedom to rotate on the input shaft, can be moved from a disengaged position when it is away from the component, into an engaged position when it is close to the component, the pulley having a groove of constant predetermined width for accepting the belt so that when the belt is taut inside the groove, the belt tension is maintained as the pulley moves along the input shaft.

12 Claims, 6 Drawing Sheets

(56) References Cited

U.S. PATENT DOCUMENTS

| | | | |
|---|---|---|---|
| 4,322,934 A * | 4/1982 | Doi | 56/11.1 |
| 4,857,033 A * | 8/1989 | Czarka | 474/14 |
| 4,924,988 A * | 5/1990 | Page | 192/70.23 |
| 5,377,774 A * | 1/1995 | Lohr | 180/19.3 |
| 5,778,645 A * | 7/1998 | Irikura et al. | 56/11.8 |
| 6,186,916 B1 * | 2/2001 | Blanchard | 474/14 |
| 6,475,109 B2 * | 11/2002 | Blanchard | 474/101 |
| 6,755,759 B2 * | 6/2004 | Blanchard | 474/19 |
| 7,311,184 B2 * | 12/2007 | Patridge | 192/16 |
| 7,364,024 B2 * | 4/2008 | Bartell et al. | 192/18 R |
| 7,641,580 B2 * | 1/2010 | Blanchard | 475/209 |
| 7,850,555 B2 * | 12/2010 | Keane et al. | 474/19 |
| 8,226,508 B2 * | 7/2012 | Osborne | 474/101 |
| 8,393,985 B2 * | 3/2013 | Blanchard | 474/37 |
| 8,668,607 B2 * | 3/2014 | Brind'Amour et al. | 474/46 |
| 2005/0148415 A1 * | 7/2005 | Hartley | 474/8 |

* cited by examiner

TRANSMISSION DEVICE FOR SELF-PROPELLED EQUIPMENT AND SELF-PROPELLED EQUIPMENT FITTED WITH SUCH A TRANSMISSION

The present invention relates to a transmission device for self-propelled equipment and to an item of self-propelled equipment fitted with such a transmission.

It relates more particularly to a transmission device of the type comprising a housing fitted with a driving input shaft and with an output shaft to which the movement of the input shaft is transmitted, this input shaft bearing a receiving pulley of a belt transmission around which pulley the belt of the said transmission is wrapped.

Such transmission devices are well known to those versed in this art. Hitherto, in such a transmission device, when the belt transmission is a disengageable transmission, there are two options. The first option is to make the housing so that it can pivot about its output shaft to allow the belt to move from a relaxed state to a taut state and vice versa. This solution has the disadvantage advantage of entailing the presence of belt guides to guarantee that the belt will go from the relaxed state to the taut state. Further, such a set up, because the housing turns, imposes a direction of rotation at the output shaft when the housing is also internally fitted with at least one so-called automatic clutch engagement mechanism so the disengagement can occur only for one direction of rotation of the output shaft. Finally, the user is always dubious as to the effectiveness of the transmission when the belt has a relaxed state. The second option is to use a receiving pulley the cheeks of which have a variable separation. The pulley therefore has a position in which its cheeks are widely spaced, in which position the belt is away from the bottom of the groove and in contact with a rolling bearing member that forms the bottom of the pulley groove and a position in which the cheeks of the pulley are close together in which position the belt is taut between the said cheeks. Once again, as far as the user is concerned, there is a relaxed state of the belt which may leave doubt in the user's mind as to the effectiveness of the transmission. Furthermore, with this solution there is a need for a belt guide. Finally, the various options of bringing the pulley cheeks closer together do not guarantee that the diameter on which the belt is wrapped will be substantially constant, and this may lead to an undesired variation in the rotational speed at which the input shaft is driven.

It is therefore an object of the present invention to propose a transmission device for self-propelled equipment of the aforementioned type, the design of which allows the use of a receiving pulley that is disengageable while at the same time keeping the belt always under tension in the groove of the said pulley.

To this end, the subject of the invention is a transmission device for self-propelled equipment, of the type comprising a housing equipped with a driving input shaft and with an output shaft to which the movement of the input shaft is transmitted, this input shaft bearing a receiving pulley of a belt transmission, around which pulley the belt of this transmission is wrapped, characterized in that the input shaft also bears a component that rotates as one with the said shaft and a member for controlling the movement of the pulley along the said input shaft in terms of the movement of the pulley towards or away from the said component so that the pulley, which is mounted with the freedom to rotate on the input shaft, can be moved from the disengaged position when it is away from the said component, into the engaged position when it is close to the said component, the said pulley having a groove of constant predetermined width for accepting the belt so that when the belt is taut inside the groove, the belt tension can be maintained as the pulley moves along the input shaft.

Because the receiving pulley has a groove of predetermined constant width, considered in a direction parallel to the longitudinal axis of the input shaft, the pulley, which is of the type said to have a substantially constant belt wrapping diameter, is able to keep the belt in a substantially constant predetermined position with respect to the bottom of the pulley groove as the pulley moves along the input shaft. Thus, with respect to the input shaft, the pulley is able to move from a disengaged position in which it is away from the component that rotates as one with the input shaft and is free to turn about the input shaft independently of the component that rotates as one with the said input shaft, so that the rotational movement of the pulley-belt assembly is not transmitted to the input shaft, into an engaged position in which it is close to the component that rotates as one with the input shaft and therewith forms an assembly that all rotates as one so that the rotational movement of the pulley-belt assembly is transmitted via the said component to the input shaft. It may be noted that, irrespective of whether the said pulley is in its disengaged or engaged position, the belt remains taut inside the groove of the said pulley.

There are various conceivable ways in which the invention may be embodied.

Thus, in a first embodiment of the invention, when the pulley is close to the said component it is in frictional contact with the said component via the belt.

In a second embodiment of the invention, when the pulley is close to the said component, it is in direct frictional contact with the said component.

Irrespective of the embodiment adopted, the receiving pulley is formed of two circular cheeks which are joined together with a fixed spacing by a hub which, with the opposing faces of the cheeks delimits the groove that accommodates the belt of the pulley.

For preference, the component that rotates as one with the input shaft and to which the rotational movement of the receiving pulley is transmitted is a component of the flange or cup kind, open at the centre, so that it can be slipped over the said input shaft.

For its part, the control member is preferably a rotary control member which adopts the form of a sleeve slipped over the input shaft, this sleeve being equipped at one of its ends with ramps able to collaborate in bearing contact with complementary ramps formed on the external face of the housing so that as the sleeve is turned about the input shaft, it is caused to move axially along the said input shaft.

In general, the control member is a rotary control member which, in order to rotate it about the input shaft, is fitted with a cable control.

For preference, the housing is fitted with means for keeping the belt taut, these tension-maintaining means comprising at least one spring coupled, at one end, to the housing and which, at its opposite end, can be coupled to the equipment on which the said housing is intended to be installed. This spring is able to compensate for the gradual wearing of the belt which is liable to cause the belt to slacken. This spring therefore has a tendency to return the housing to a predetermined position by rotating the housing about the output shaft of the said housing.

In general, in order to allow the receiving pulley to be mounted with the freedom to turn on the input shaft, the transmission device comprises a rolling bearing member borne by the input shaft and interposed between control member and pulley, the pulley surrounding the said rolling bearing member.

For preference also, the output shaft of the housing bears, on the one hand, a toothed wheel in mesh with the input shaft capable of turning the said wheel and, on the other hand, at least one clutch engagement mechanism arranged, inside the housing, between toothed wheel and output shaft for driving at least one wheel of the equipment, this clutch engagement mechanism being activated by the turning of the toothed wheel and able to be deactivated by rotating the output shaft that drives at least one wheel of the equipment, when the input shaft is stationary or when the rotational speed of the output shaft that drives at least one wheel of the equipment is higher than the rotational speed of the toothed wheel.

This configuration makes it possible for one and/or the other wheel of a pair of wheels of the equipment to freewheel in the deactivated state of the corresponding clutch engagement mechanism.

A further subject of the invention is a self-propelled rolling equipment, characterized in that it is fitted with a transmission device of the aforementioned type.

The invention will be clearly understood from reading the following description of embodiments, given with reference to the attached drawings in which.

Figure 1:
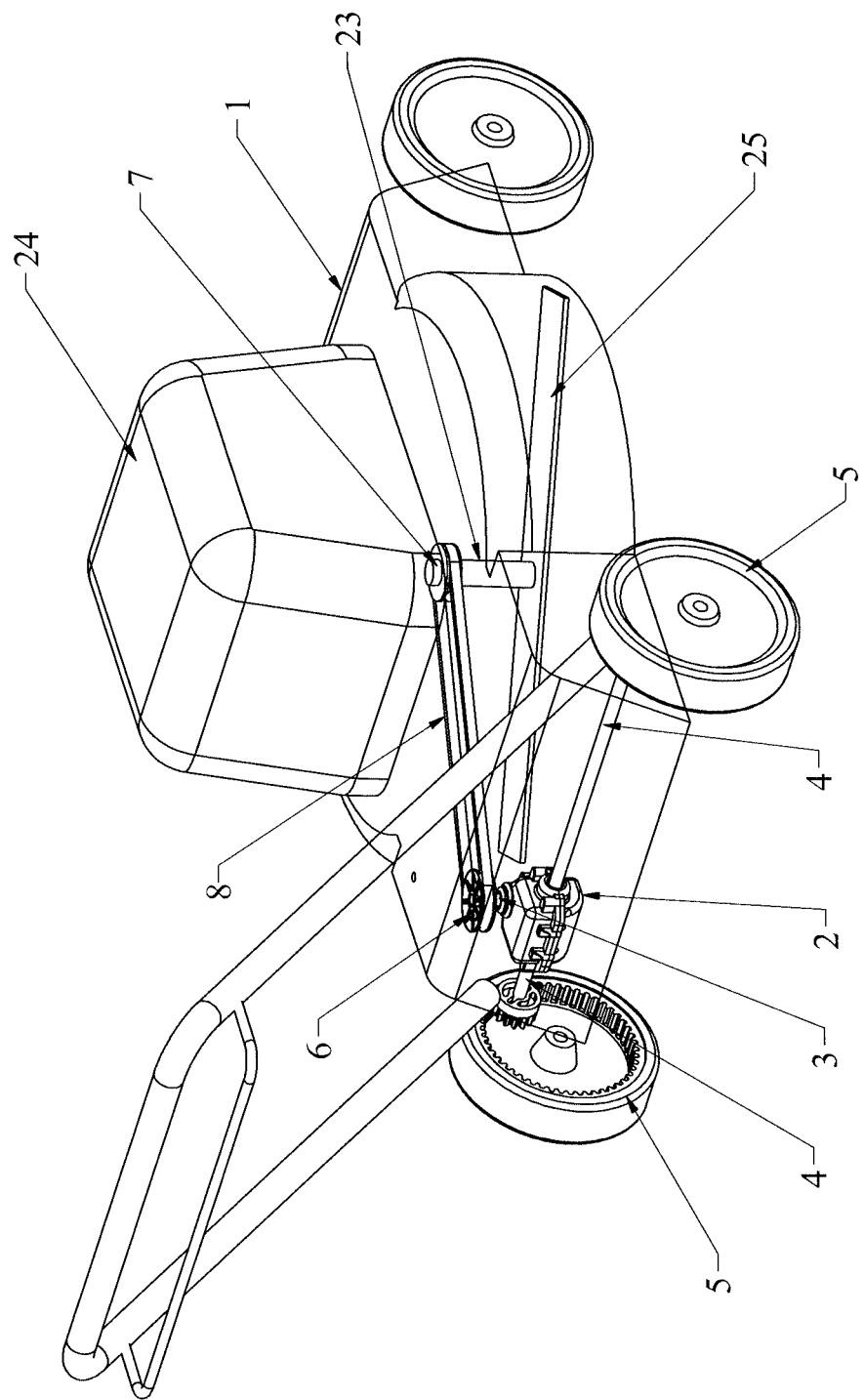
FIG. 1 is a perspective view of the general arrangement of an item of equipment, in this particular instance a lawn mower, fitted with a transmission device according to the invention.

As mentioned hereinabove, the transmission device that forms the subject of the invention is more particularly intended to be applied to rolling equipment 1, notably equipment with a walking operator. FIG. 1 depicts the application of such a transmission device to a lawn mower. This equipment generally comprises a rolling chassis, the wheels of this chassis being depicted as 5 in the figures. The equipment is fitted with an engine 24. The driven output shaft 23 for example bears, on the one hand, a cutting blade 25 and, on the other hand, a driving pulley 7 connected by a belt 8 to a receiving pulley 6. The driving pulley 7, receiving pulley 6 and belt 8 form a belt transmission. This receiving or driven pulley 6 is itself mounted on an input shaft 3 intended to be housed at least partially in a transmission housing 2. This input shaft 3 transmits its movement to the output shaft 4 of the said housing which forms the output shaft 4 that drives at least one wheel 5 of the equipment. This input shaft 3 and output shaft 4 run substantially orthogonal to one another. The input shaft 3 which bears the receiving pulley 6 of the belt transmission, and the belt 8 of the said transmission which is wrapped around the receiving pulley 6, furthermore bears a component 9 that rotates as one with the said shaft 3 and a member 10 that controls the movement of the pulley 6 along the said input shaft 3 in terms of the pulley 6 being moved closer to or away from the said component 9 so that the pulley 6, which is mounted with the ability to move axially and the freedom to rotate on the input shaft 3, can be moved from the disengaged position away from the said component 9, into the engaged position close to the said component 9. In the disengaged position, the receiving pulley 6 does not transmit its rotational movement to the input shaft 3. In the engaged position, the receiving pulley 6 transmits its rotational movement to the input shaft 3. The receiving pulley 6 is therefore able, as it moves axially along the said input shaft 3, to be coupled to or uncoupled from the component 9. The said pulley 6 has a groove 11 of constant predetermined width for receiving the belt 8 so that when the belt 8 is taut inside the groove 11 the belt 8 tension can be maintained as the pulley 6 moves along the input shaft.

Figure 2:
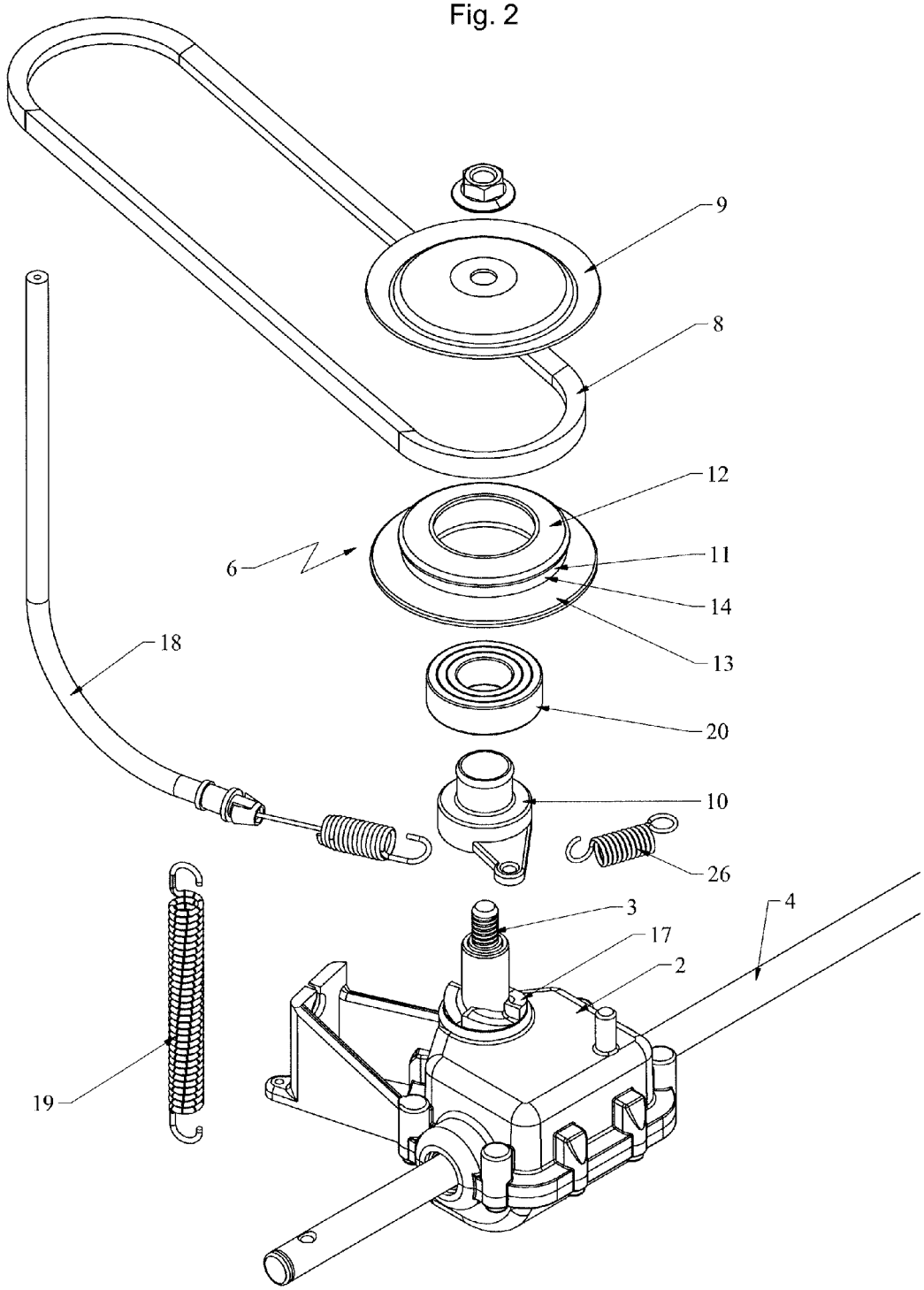
FIG. 2 is a partially exploded perspective view of the elements that make up a first embodiment of a transmission device according to the invention.
Figure 3A:
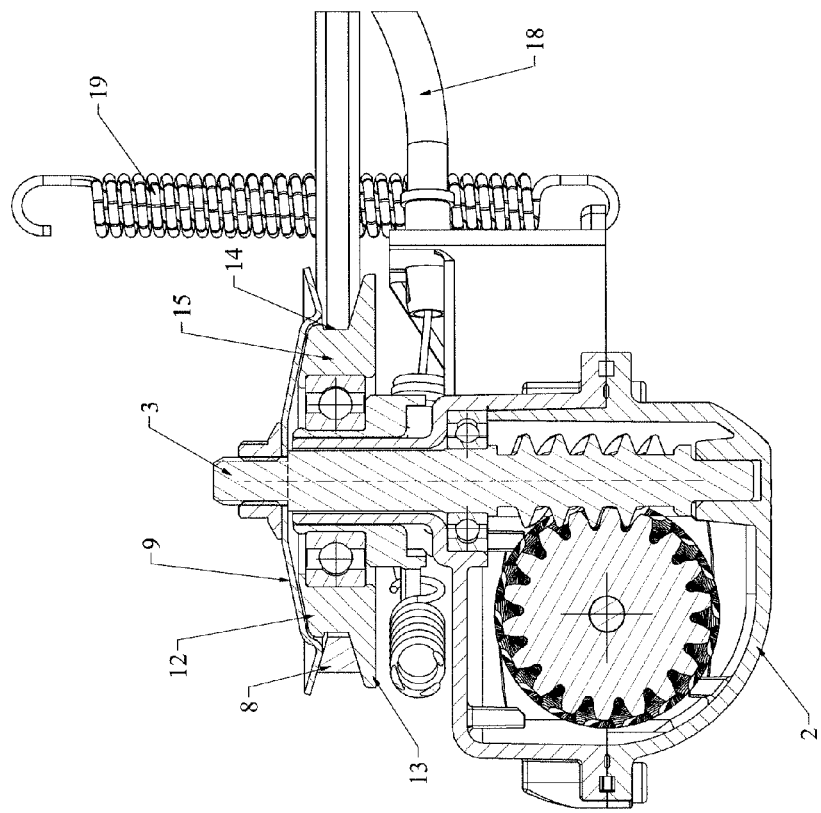
FIGS. 3A and 3B are views in cross section of the transmission device of FIG. 2 with the pulley in the disengaged position (FIG. 3A) and with the said pulley in the engaged position (FIG. 3B)
Figure 3B:
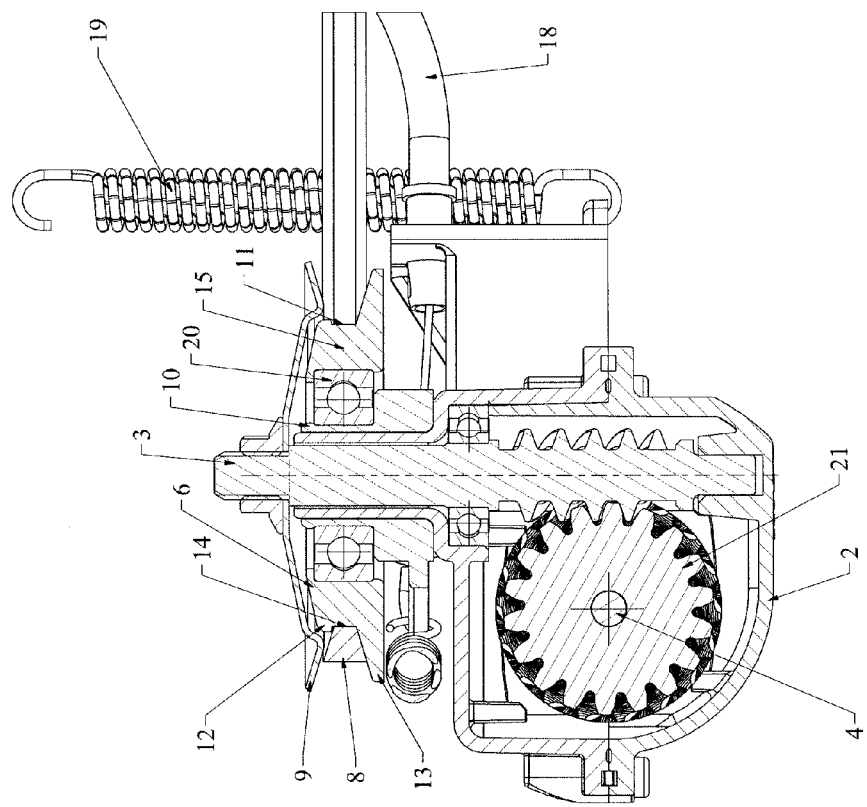

In one embodiment of the invention in accordance with FIGS. 2, 3A and 3B, when the pulley 6 is close to the said component 9 it is in frictional contact with the said component 9 via the belt 8.

The rotational movement of the belt-receiving pulley 6 assembly is therefore transmitted via the belt 8 and the component 9 that rotates as one with the input shaft 3 to the input shaft 3.

In this embodiment, the receiving pulley 6, which is slipped over the input shaft 3, is formed of two circular cheeks 12, 13 which are joined together with a fixed spacing by a hub 15 which, with the opposing faces of the cheeks 12, 13 delimits the groove 11 that accommodates the belt 8 of the pulley 6. The pulley cheek 12 closest to the component 9 that rotates as one with the input shaft 3 is a cheek that is said to be truncated having a diameter smaller than the diameter of the other cheek 13 so as to form, beyond the interruption of the said cheek 12, a region in which the belt 8 can come into contact with the component 9 when the pulley 6 is up close to the component 9. The component 9 that rotates as one with the input shaft 3 and to which the rotational movement of the receiving pulley 6 is transmitted is a component of the flange or cup kind, open at the centre, so that it can be slipped over the said input shaft 3.

The movement of the pulley from the disengaged position into the engaged position corresponds to the change from FIG. 3A, in which the receiving pulley 6-belt 8 assembly is away from the component 9 to FIG. 3B in which the receiving pulley 6-belt 8 assembly is close to and in frictional contact with the component 9 so as to allow the rotational movement to be transmitted from the pulley-belt assembly to the said component 9 which is itself mounted to rotate as one with the input shaft 3 by being pinned or screwed thereto using a nut as depicted, or by way of splines or the like.

Figure 4:
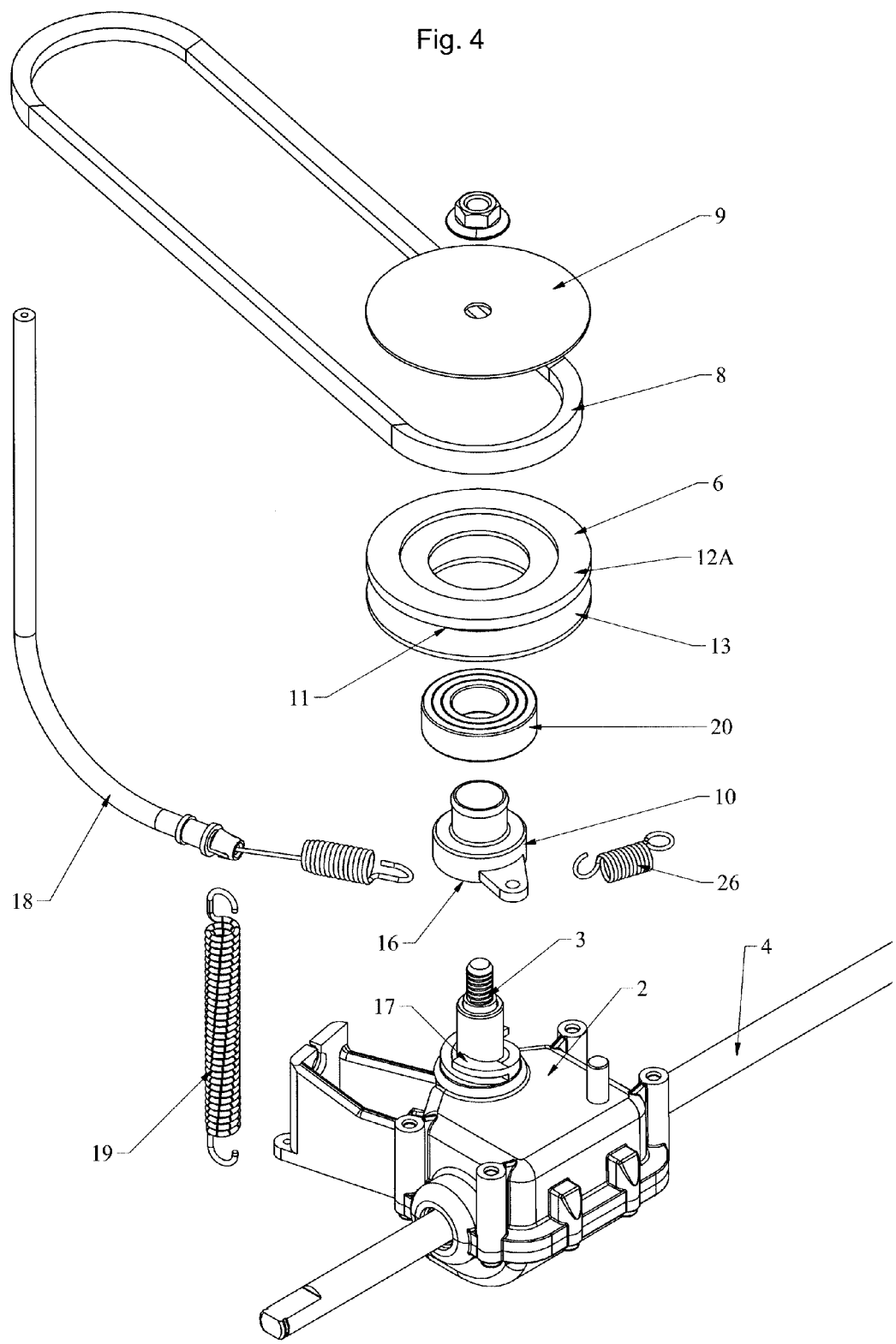
FIG. 4 is a partially exploded perspective view of the elements that make up a second embodiment of a transmission device according to the invention.
Figure 5A:
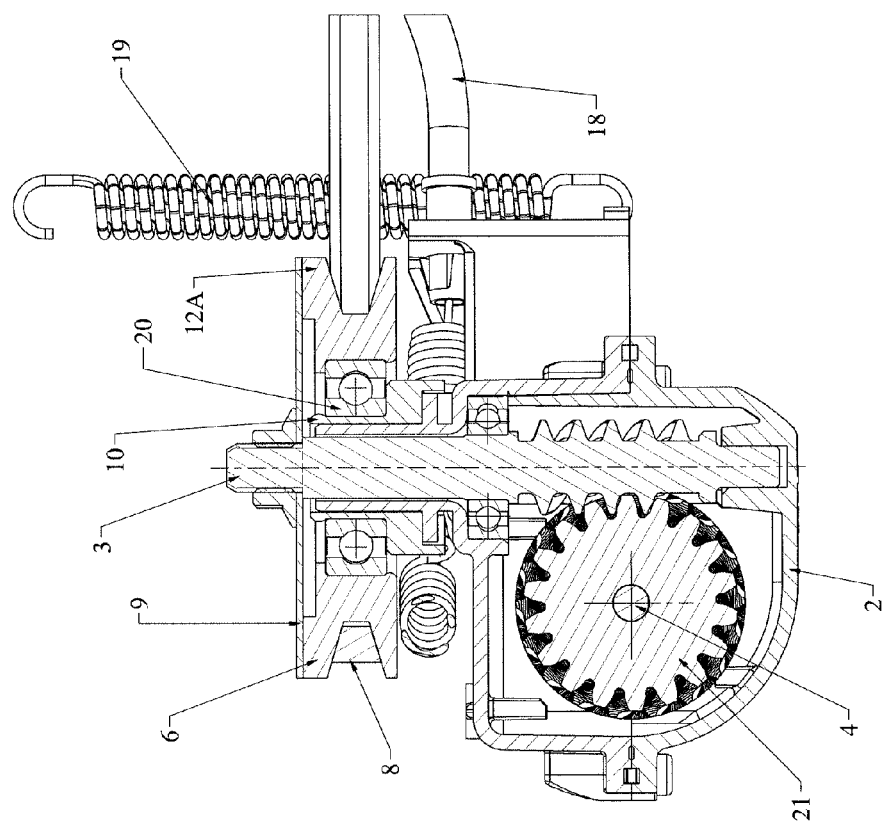
FIGS. 5A and 5B are views in cross section of the device of FIG. 4 with the pulley in the disengaged position (FIG. 5A) and with the said pulley in the engaged position (FIG. 5B)
Figure 5B:
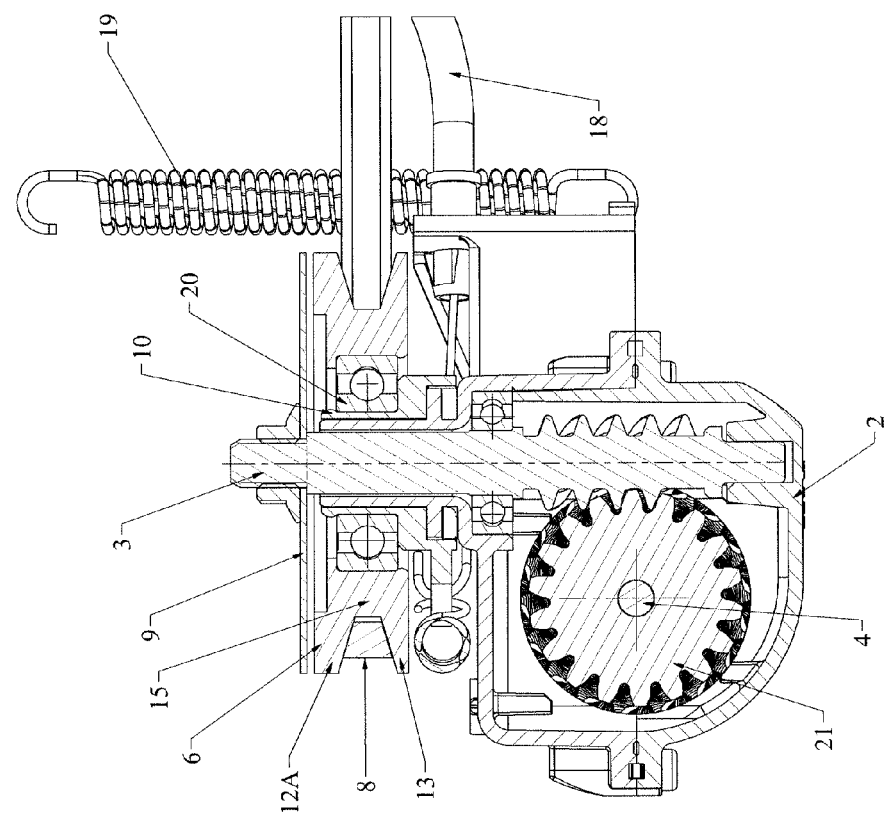
Figure 6:
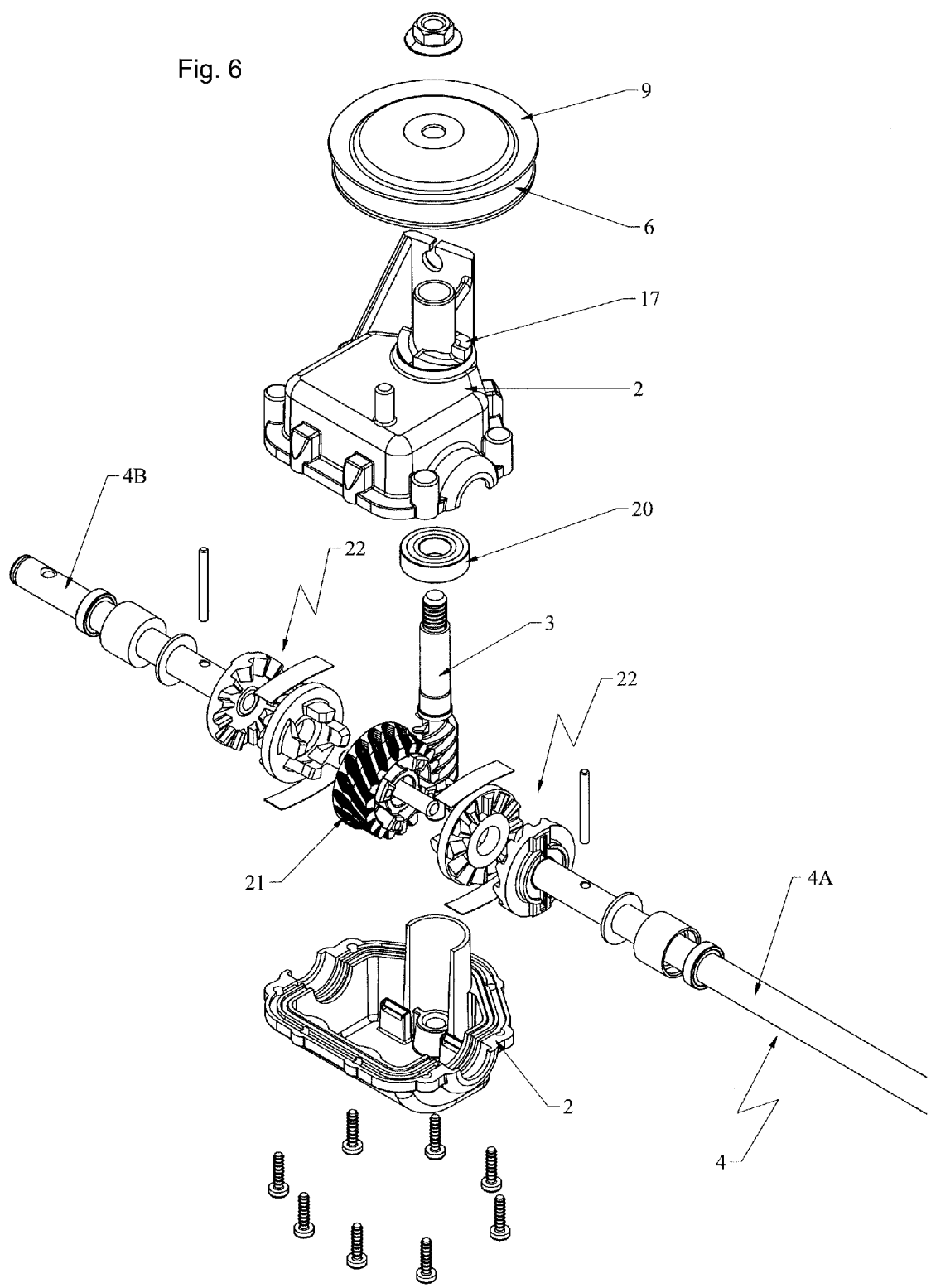
FIG. 6 is an exploded perspective part view of at least some elements of a transmission device according to the invention.

In a second embodiment of the invention according to FIGS. 4, 5A and 5B, when the pulley 6 is close to the said component 9, it is in direct frictional contact with the said component 9.

In this embodiment, once again, the receiving pulley 6 is formed of two circular cheeks 12A, 13 which are joined together with a fixed spacing by a hub 15 which, with the opposing faces of the cheeks 12A, 13 delimits the groove 11 that accommodates the belt 8 of the pulley 6. The cheeks 12A and 13 are preferably of the same diameter. Note that the cheek here is depicted as 12A to differentiate it from the cheek 12 of the first embodiment of the invention which is a truncated cheek.

Once again, the component 9 that rotates as one with the input shaft 3 and to which the rotational movement of the receiving pulley 6 is transmitted is a component of the flange or cup kind, open at the centre, so that it can be slipped over the said input shaft 3. Therefore in this instance the cheek 12A comes directly into frictional bearing contact with the component 9 in order to transmit its rotational movement to it.

Irrespective of the embodiment adopted, the control member 10 is a rotary control member which adopts the form of a sleeve slipped over the input shaft 3, this sleeve being equipped at one of its ends with ramps 16 able to collaborate in bearing contact with complementary ramps 17 formed on the external face of the housing 2 so that as the sleeve is turned about the input shaft 3, it is caused to move axially along the said input shaft 3. These ramps are preferably circular ramps coaxial with the input shaft 3.

To drive its rotation about the input shaft 3, the control member 10 is fitted with a cable control 18 which comprises at least a spring-loaded cable actuated from a control lever or handle positioned at the handlebar or steering wheel of the equipment. The pull on the cable causes the sleeve that constitutes the control member 10 to move angularly about the input shaft 3 and axially along the said shaft 3 because of the presence of the ramps. Release of the cable causes an angular and axial movement of the control member 10 in the opposite direction, under the effect of a return spring 26.

In the examples depicted, in order for the pulley to be mounted on the input shaft 3 with freedom to turn, the device comprises a rolling bearing member 20 borne by the input shaft 3 and interposed between the control member 10 and the pulley 6, the pulley 6 surrounding the said rolling bearing member 20.

Finally, the housing 2 is fitted with a spring 19 coupled at one end to the housing 2 and which at its opposite end can be coupled to the equipment 1 on which the said housing 2 is intended to be installed. This spring is a helical spring which returns the housing to a predetermined position corresponding to the belt being taut by rotating the said housing about the output shaft 4.

There are various conceivable options for transmitting the movement of the input shaft 3 of the housing to the output shaft 4 of the housing.

In the example depicted, the output shaft 4 of the housing bears, on the one hand, a toothed wheel 21 in mesh with the input shaft 3 capable of turning the said wheel 21 and, on the other hand, at least one clutch engagement mechanism 22 arranged, inside the housing 2, between toothed wheel 21 and output shaft 4 for driving at least one wheel 5 of the equipment, this clutch engagement mechanism 22 being activated by the turning of the toothed wheel 21 and able to be deactivated by rotating the output shaft 4 that drives at least one wheel 5 of the equipment, when the input shaft 3 is stationary or when the rotational speed of the output shaft 4 that drives at least one wheel 5 of the equipment is higher than the rotational speed of the toothed wheel 21.

In particular, the output shaft 4 of the housing is preferably formed of at least two half-shafts 4A, 4B each coupled to one wheel 5 of the equipment and the housing 2, on each side of the toothed wheel 21, houses two engagement clutch mechanisms 22 each collaborating with one of the half-shafts 4A, 4B that drive the wheel of the equipment so as to allow one and/or the other wheel of a pair of wheels of the equipment to freewheel.

In the example depicted, each clutch engagement mechanism 22 is activated by rotating the toothed wheel 21 and moving at least one component axially along the said output shaft. This component, able to move axially on or along the output shaft, bears at least one ramp collaborating with a component that rotates as one with the said shaft in order, in the cutch-engagement phase, to cause the ramp or ramps of the moving component and the component that rotates as one with the wheel drive shaft to rotate as one thus transmitting the rotational movement from the component to the output shaft and, in the clutch disengagement phase, to disconnect the ramp or ramps of the moving component from the component that rotates as one with the shaft. In particular, the toothed wheel, on each of its faces, has ramps that collaborate with complementary ramps borne by a clutch plate mounted with the freedom to turn on the output shaft and able to move axially under the action of the said ramps, this plate being itself, as it moves, able to be coupled to or uncoupled from a component that is secured to the output shaft.

In the example depicted, this clutch plate is provided, on each of its faces, with ramps. The ramps on one face of the clutch plate collaborate, during the clutch-engagement phase, with the ramps of the toothed wheel to cause the plate to move axially in a first direction of causing the plate to rotate as one with a wheel borne by the output shaft and that rotates as one therewith, the ramps of the other face of the plate collaborating, during the clutch disengagement phase, with ramps of the wheel borne by the output shaft and that rotates as one therewith in order, by causing the said plate to move axially in the opposite direction, to cause the corresponding output shaft to freewheel.

Each clutch engagement mechanism is activated by turning the toothed wheel. This turning of the toothed wheel is obtained, once the receiving pulley 6 has moved into the engaged position, i.e. when the drive shaft is turning, when the receiving pulley 6 is controlled by the control member 10 to make it move closer to the component 9 until it comes into direct or indirect contact therewith in order to transmit its rotational movement to the input shaft 3 which is itself a worm which transmits its movement to the toothed wheel 21 with which it is in mesh. Deactivation of the clutch mechanism is obtained by turning one of the output half-shafts when the input shaft is stationary. Specifically, while the input shaft is stationary, the inertia of the machine causes the machine to continue to move far enough to turn the output shafts of the equipment and thereby deactivate the clutch engagement mechanism. Likewise, each clutch mechanism is designed to be deactivated when the rotational speed of the output shaft bearing the said mechanism is higher than the rotational speed of the toothed wheel. When the clutch engagement mechanism is in the deactivated state, the wheel of the equipment and the half-shaft that carries it can turn freely in both directions of rotation. Further, each wheel of a pair of wheels of the equipment can turn independently of the other wheel of the equipment.

Each receiving pulley 6 is for its part returned to the disengaged position simply by release of the control cable. The receiving pulley then has a tendency, under the effect of its own weight, to move away from the component 9 at least in terms of axial movement along the input shaft 3. In all of its positions, the belt 8 is taut and remains pressing against the bottom 14 of the groove 11 of the pulley 6.

The invention claimed is:

1. A transmission device for self-propelled equipment comprising:
    a housing equipped with a driving input shaft and with an output shaft to which the movement of the input shaft is transmitted, the input shaft bearing:
- a receiving pulley of a belt transmission, rotatably-mounted on the input shaft, around which pulley the belt of the belt transmission is wrapped,
- a component that rotates as one with said input shaft, and
- a member configured to control the movement of the pulley along said input shaft, towards or away from said component, to move the pulley between a disengaged position when the pulley is not in frictional contact with said component and does not transmit its rotational movement to the input shaft, and an engaged position when the pulley is in frictional contact with said component and transmits its rotational movement to the input shaft,
- said pulley having a groove of constant predetermined width for accepting the belt so that when the belt is taut inside the groove, the belt tension is maintained as the pulley moves along the input shaft between the disengaged and the engaged positions.

2. The device according to claim 1, wherein when the pulley is close to said component, the pulley is in frictional contact with said component via the belt.

3. The device according to claim 1, wherein when the pulley is adjacent to said component, the pulley is in direct frictional contact with said component.

4. The device according to claim 1, wherein the receiving pulley is formed of two circular cheeks which are joined together with a fixed spacing by a hub which, with the opposing faces of the cheeks delimits the groove that accommodates the belt of the pulley.

5. The device according to claim 4, wherein a pulley cheek closest to the component that rotates as one with the input shaft is truncated, having a diameter smaller than a diameter of the other cheek so as to form, beyond interruption of said cheek, a region in which the belt can come into contact with the component when the pulley is up close to the component.

6. The device according to claim 1, wherein the component that rotates as one with the input shaft and to which the rotational movement of the receiving pulley is transmitted is a flange or cup, open at the center, so that the flange or cup is configured to be slipped over said input shaft.

7. The device according to claim 1, wherein the control member is a rotary control member which adopts the form of a sleeve slipped over the input shaft, the sleeve being equipped at one of its ends with ramps configured to collaborate in bearing contact with complementary ramps formed on the external face of the housing so that as the sleeve is turned about the input shaft, the sleeve is caused to move axially along said input shaft.

8. The device according to claim 1, wherein the control member is a rotary control member which, in order to rotate about the input shaft, is fitted with a cable control.

9. The device according to claim 1, wherein the housing is fitted with a tension-maintaining element for keeping the belt taut, the tension-maintaining element comprising at least one spring coupled, at one end, to the housing and which, at its opposite end, can be coupled to the self-propelled equipment on which said housing is intended to be installed.

10. The device according to claim 1, further comprising a rolling bearing member borne by the input shaft and interposed between control member and pulley, the pulley surrounding said rolling bearing member.

11. The device according to claim 1, wherein the output shaft of the housing bears a toothed wheel in mesh with the input shaft capable of turning said wheel and at least one clutch engagement mechanism arranged, inside the housing, between the toothed wheel and the output shaft for driving at least one wheel of the equipment, the clutch engagement mechanism being activated by turning of the toothed wheel and configured to be deactivated by rotating the output shaft that drives at least one wheel of the equipment, when the input shaft is stationary or when the rotational speed of the output shaft that drives at least one wheel of the equipment is higher than the rotational speed of the toothed wheel.

12. A self-propelled rolling equipment that is fitted with a transmission device according to claim 1.

\* \* \* \* \*